United States Patent [19]

Yatzsuzuka et al.

[11] Patent Number: 5,263,020

[45] Date of Patent: Nov. 16, 1993

[54] ECHO CANCELLER

[75] Inventors: Youtaro Yatsuzuka, Kanagawa; Fumiaki Sugaya, Tokyo, both of Japan

[73] Assignee: Kokusai Denshin Denwa Co., Ltd., Tokyo, Japan

[21] Appl. No.: 848,781

[22] Filed: Mar. 10, 1992

[30] Foreign Application Priority Data

Mar. 14, 1991 [JP] Japan ................................ 3-73757

[51] Int. Cl.$^5$ ........................ H04L 5/14; H04B 3/23
[52] U.S. Cl. ................................. 370/32.1; 379/410; 379/406
[58] Field of Search ................. 370/32, 32.1; 379/406, 379/410, 411

[56] References Cited

U.S. PATENT DOCUMENTS

| 4,817,081 | 3/1989 | Wouda et al. | 370/32.1 |
| 4,868,874 | 9/1989 | Takatori et al. | 370/32.1 |
| 4,922,530 | 5/1990 | Kenney et al. | 370/32.1 |
| 4,965,823 | 10/1990 | Nakagawa et al. | 370/32.1 |
| 4,972,467 | 11/1990 | Nakagawa et al. | 370/32.1 |
| 5,029,167 | 7/1991 | Arnon et al. | 370/32.1 |

OTHER PUBLICATIONS

"A Cascadable VLSI Echo Canceller", Tao et al, IEEE Journal on Selected Areas in Communications, vol. SAC-2, No. 2, Mar. 1984, pp. 297-303.

"Echo Canceler with Two Echo Path Models", Ochiai et al, IEEE Transactions on Communications, vol. COM-25, No. 6, Jun. 1977, pp. 589-595.

*Primary Examiner*—Wellington Chin
*Attorney, Agent, or Firm*—Nikaido, Marmelstein, Murray & Oram

[57] ABSTRACT

In an echo canceller used in a four-wire digital telephone circuit, a main echo estimator (21) and a sub echo estimator (22) are coupled with a receive path for measuring a receive signal, and subtracters (25, 26) are inserted in a transmit path for cancelling an echo component in a transmit signal. Filter coefficients in said estimators (21, 22) are adaptively controlled by a convergence control processor (24). The main echo estimator has a small step gain for updating filter coefficients so that the response to an echo is slow, while the sub echo estimator (22) has a large step gain and quick response for an echo. An register accumulator (23) is provided so that the filter coefficients by the sub echo estimator (22) are selectively accumulated on the related filter coefficients in the main echo estimator (21) according to operation modes, ordinary mode, accumulating mode, and reset mode. In an ordinary mode, said two echo estimators (21, 22) operate independently from each other, updating the filter coefficients. In an accumulating mode, when an echo output of the second subtracter (26) is lower than that of the first subtracter (25), and the filter coefficients in the sub echo estimator (22) converge, the filter coefficients in the sub echo estimator (22) are accumulated on the related ones in the main echo estimator (21), respectively, and after reset of the coefficients in the sub echo estimator (22), the mode is then switched to the ordinary mode. When the filter coefficients in the sub echo estimator (22) diverge, or echo output of the second subtracter (26) is larger than that of the first subtracter (25), the sub echo estimator (22) is reset, and then, the mode is switched to the ordinary mode.

10 Claims, 12 Drawing Sheets

ECHO CANCELLER

BACKGROUND OF THE INVENTION

The present invention relates to an echo canceller for a telephone channel including mobile communications, and/or an acoustic channel having a long transmission delay in tele-conferences.

In a telephone channel having a four-wire long distance trunk, hybrid circuits are connected for 2wire-4wire conversion. The hybrid circuits at each end of a call interface two-wire subscriber loops to the four-wire long distance trunk. The near-end echo of a far-end talker on the transmit path through the hybrid circuit is returned to the talker who perceives it as an echo. The annoyance it causes by impairing telephone quality increases with both its strength and the length of the delay as in the case of the long delay involved in satellite communications. To solve these problems, an echo canceller has been used.

On the other hand, in a tele-conference having only a 4-wire connection, an acoustic reflection of the far-end talker in a conference room is also returned to the talker who perceives it as an echo. To cancel the echo, an acoustic echo canceller was also used.

FIG. 1 shows the basic echo canceller structure for cancelling the echo in a telephone channel. The transmit input signal Sin at the transmit input port (5) is returned as the near-end echo over the echo path which corresponds to the circuit from the receive output port (3) to the transmit input port (5) through the hybrid circuit (4). The hybrid circuit (4) transmits the receive output signal through the port (15) to the near end talker. The prior echo canceller (1) controls the echo by synthesizing a replica of the near-end echo by an echo estimator (6), and subtracting this replica from the transmit input signal Sin at a subtracter (7). The residual echo derived as the output of the subtracter (7) is transmitted either directly or after being processed by a non-linear unit like a center clipper through the transmit output port (8) of the echo canceller (1). The input and output signals of the echo canceller (1) are assumed to be digitized and processed digitally in it.

In the echo estimator (6) which comprise an adaptive digital transversal filter having a finite impulse response (FIR), the filter coefficients are adaptively updated to minimize the level of the residual echo either at every sample time or at every sample intervals. As the adaptation algorithm for updating the filter coefficients, Least Mean Square(LMS) or modified LMS methods are well known. The echo estimator (6) with coefficients updating by the modified LMS algorithm is assumed hereafter.

FIG. 2 shows the functional structure of a prior echo canceller (1) which comprise an echo estimator (6), the subtracter (7), double talk detector (13) and low level detector (14). The echo estimator (6) comprise an X register (9) which stores the receive input signal Rin from the receive input port (2), an H register (10) which stores the filter coefficients corresponding to the impulse response of the adaptive filter, a convolution circuit (11) which generates the estimate (the replica of the transmit input signal Sin) by using Rin stored in the X register (9) and the filter coefficients in the H register (10), and an adaptation control processor (12) which updates the filter coefficients stored in the H register (10) to minimize the level of the residual echo derived from the subtracter (7). A step gain in the updating, which corresponds to a convergence speed of the adaptive filter, is chosen according to the outputs of the double talk and low level detectors (13, 14).

In the adaptation control processor (12), the filter coefficients are updated by using the residual echo Re and Rin. In the double talk detector (13), when a double talk situation indicating both talkers active at the near-end and the far-end is detected, a control signal is output to the adaptation control processor (12) for inhibiting the coefficient updating during double talking (setting the step gain zero for the updating). The low level detector (14) for the receive input signal Rin also outputs a control signal to the adaptation control processor (12) whether the coefficients are updated or not. If a level below a given threshold is detected, then the coefficient updating is prohibited during the detected period to prevent the coefficients in the H register (10) from divergence due to channel noise in the transmit path. The divergent coefficients in the H register (10) produce a large estimate, resulting in a residual echo larger than the transmit input signal.

The X register (9) stores N samples of Rin from the n-th sampling index to the (n−(N−1))-th sampling index into $x(n)$, $x(n-1)$, ., $x(n-(N-1))$. The coefficients of the transversal filter having N taps are also stored in the H register (10). The i-th coefficient is given by $Hi(n)$ at the n-th sampling index, where i varies from 0 to $N-1$. Through the convolution circuit (11), the filter output $y(n)$ is given as an estimate by $$y(n) = \sum_{i=0}^{N-1} x(n-i) * Hi(n). \quad [1]$$

The residual echo $Re(n)$ at the n-th sampling index is also given by $$Re(n) = Sin(n) - y(n), \quad [2]$$

where $Sin(n)$ is the transmit input signal at the transmit input port (5).

To minimize the level of the residual echo $Re(n)$, the coefficients in the H register (10) are updated by the modified LMS algorithm given by $$Hi(n+1) = Hi(n) + \Delta Hi(n), \quad [3]$$

$$= Hi(n) +$$

$$g * Re(n) * x(n-i) / \left( \sum_{j=0}^{N-1} x(n-j) * x(n-j) \right), \quad [4]$$

where i is the i-th tap position varying from 0 to $N-1$, $\Delta Hi(n)$ is the adjustment component at the n-th sampling index, and g is a constant referred to as a step gain having a value in the range 0 to 2.

FIG. 3 shows a functional configuration of the adaptation control processor (12) implementing the formula [4]. To update the i-th tap coefficient in the H register (10) at the n-th sample index, $x(n-i)$ from the X register (9) is fed into the power calculator (150), and the residual echo $Re(n)$ is also fed into the multiplier (151) to multiply it with $x(n-i)$. In the step gain selector (153), a value of the step gain is selected from prepared values to multiply it with the output of the multiplier (151) at the multiplier (152), according to the control signals from the double talk detector (13) through the port (122) and from the low level detector (14) through the port (123). The step gain is set equal to zero for the double talk detection or the low level detection. In the divider (154), the output from the multiplier (152) is divided by the output of the power calculator (150) to obtain the adjustment component of ΔHi(n) for the i-th tap coefficient. The updated coefficient Hi(n+1) is derived from the output port (124) of the adder (155), in which ΔHi(n) is added to Hi(n) under the control from the adder controller (156). The adder is also reset in the initial stage by the adder controller (156).

When the low level detector (14) detects a receive input signal in level below a given threshold, the step gain g is set to 0, indicating non-updating for preventing the coefficient from divergence caused by channel noise existing at the transmit input port (5). In particular, the channel noise becomes more dominant than the near-end echo for low levels of the receive input signal.

When the double talk detector (13) detects the double talk situation in which the near- and far-end talkers generate talkspurts simultaneously, g is also set to 0 for preventing the coefficients from the false updating caused by the near-end talker's talkspurt which has non-correlation to the receive input signal. The double talk situation must be detected as fast as possible to decrease the step gain to either a very small value or zero so as not to diverge the filter coefficients. The divergence induces a large derivation from the impulse response of the echo path, resulting in an abrupt increment in level of the residual echo.

In the double talk detector (13), the power levels of the receive and transmit input signals Rin and Sin are calculated to compare each other. For instance, when the level of the transmit input signal Sin satisfies the formula given by [5], the double talk situation is detected, and then a control signal is output from the double talk detector (13) to inhibit the filter coefficient updating.

$$\text{Lav}(\text{Sin})/\text{Lav}(\text{Rin}) \geq \text{Lth1}, \quad [5]$$

where Lth1 is a threshold value, Lav(Rin) and Lav( Sin ) are averaged levels of the receive and transmit input signals Rin and Sin , respectively. The residual echo from the subtracter (7) may also be used instead of the transmit input signal Sin .

Whenever the double talk situation is detected by the detector (13), the small level portion of the near-end talker's talkspurt in Sin already exists before exceeding the threshold, and as a results, the coefficients in the H register (10) always diverge due to the updating before inhibiting. When the large step gain is used to achieve rapid convergence of the coefficients to the impulse response of the echo path, therefore the divergence becomes rather large, making the residual echo increase abruptly. Accordingly, during frequent double talking, or after double talking, a large residual echo is easily perceived, which influences severely the telephone quality. For these reasons, a small value of the step gain, that is 0.3 or 0.25, has to be used, sacrificing rapid convergence in changing the frequency spectrum of talkspurts or during the initial stage of echo cancelling. A low level echo related to the front-end portion of every talkspurt having a high level is easily perceived in a conventional echo canceller,.

When the impulse response of the echo path is abruptly changed due to a circuit exchanger or a short circuit break, it is difficult for the echo estimator (6) having a small step gain to converge rapidly to the new echo path property. In a low ERL (echo return loss) in the echo path, false double talk detection of the near-end echo as the near-end talker's talkspurt causes inhibition of updating the coefficients. These phenomena induce a very slow convergence to reduce the echo, resulting in serious defects in telephone quality.

No previous echo canceller was able to provide a sufficiently high performance in cancelling with rapid convergence in above circumstances. This invention however provides a new echo canceller which can resolve these problems.

A IIR digital filter is also applicable instead of the FIR digital filter in the echo estimator (6), and LMS or other adaptation algorithms for coefficient updating can be applied instead of the modified LMS.

SUMMARY OF THE INVENTION

It is an object, therefore, of the present invention to overcome the disadvantages and limitations of a prior echo canceller.

It is also an object of the present invention to provide an echo canceller which provides a high echo cancellation and rapid convergence in the echo path estimation under the conditions of channel noise, double talking, low echo return loss and/or in the initial stage.

The above and other objects are attained by an echo canceller comprising; a main echo estimator (21) for synthesizing an estimate of the transmit input signal; a subtracter (25) for subtracting this estimate from the transmit input signal to supply a main residual echo being sent to the far-end; a sub echo estimator (22) for synthesizing an estimate of the main residual echo; a subtracter (26) for subtracting this estimate from the main residual echo to supply a sub residual echo; a convergence control processor (24) for choosing the operation mode from an ordinary mode, an accumulating mode and a reset mode, depending on the situation of the sub echo estimator (22) determined by the levels of at least the main and sub residual echoes; a register accumulator (23) for accumulating the filter coefficients in the sub echo estimator (22) on the coefficients corresponding to the same tap position in the main echo estimator (21) in the accumulating mode, according to the control signal from the convergence control processor (24).

During the ordinary mode, the main and sub echo estimators (21, 22) work just like the echo estimator in the prior echo canceller (1), and the filter coefficients in the main and sub echo estimators (21, 22) are updated respectively according to the main and sub residual echoes and the receive input signal.

In the accumulating mode, in which the sub residual echo has a level lower than that of the main residual echo, providing a convergent situation of the sub echo estimator (22), the accumulation of the coefficients in the convergent sub echo estimator (22) on those corresponding to the same tap position in the main echo estimator (21) through the register accumulator (23) is performed according to the control signals from the convergence control processor (24), and after the accumulation, the convergent sub echo estimator (22) is reset to an initial condition and then the mode is switched to the ordinary mode.

In the reset mode in which the sub residual echo has a level larger than that of the main residual echo, providing a divergent situation of the sub echo estimator (22), the divergent sub echo estimator (22) is reset according to the control signal from the convergence control processor (24) and then the mode is switched to the ordinary mode.

BRIEF DESCRIPTION OF THE DRAWINGS

The foregoing and other objects, features, and attendant advantages of the present invention will be better understood by means of the following descriptions and accompanying drawings wherein.

DESCRIPTION OF THE PREFERRED EMBODIMENTS

It is assumed that input and output signals of the echo canceller are in digital form, and the echo canceller handles digital signals. A/D and D/A converters for connecting the echo canceller with analog channels are not described as they are not concern with the present invention.

EMBODIMENT 1

Figure 4:
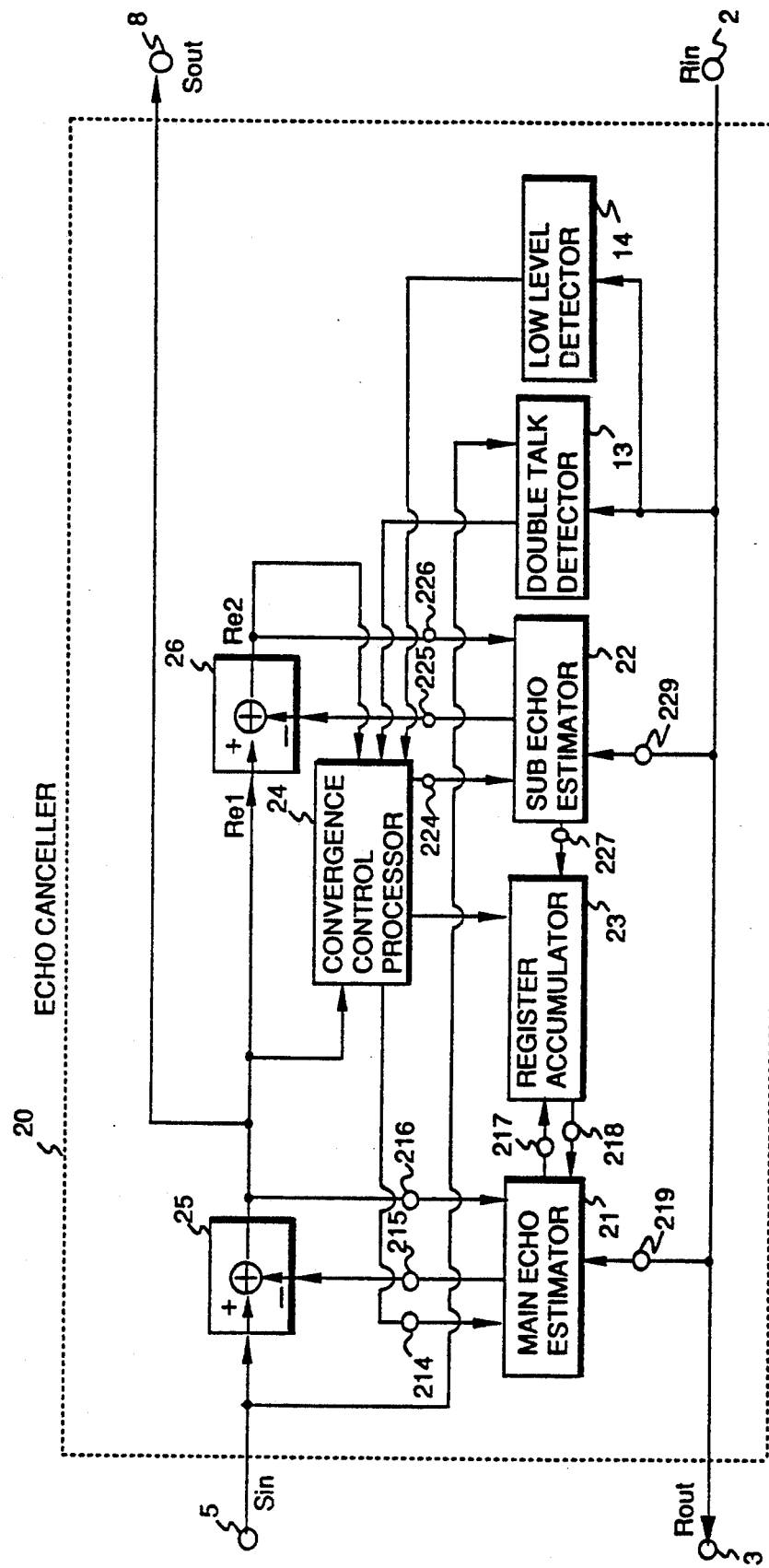
FIG. 4 is a functional configuration of an echo canceller (20) according to the present invention.

An echo canceller according to the present invention has several features in that not only a main echo estimator but also a sub echo estimator are used and subtracters coupled with either the main echo estimator or the sub echo estimator are connected in cascade in the configuration. FIG. 4 shows the functional configuration of the present echo canceller (20) in which a pair of the main and sub echo estimators (21, 22) is used. The same numerals as those in the figures denote identical elements.

The main echo estimator (21) supplies an estimate to the subtracter (25) to obtain the main residual echo by subtracting it from the transmit input signal Sin. The main residual echo is then fed into the subtracter (26). When the level of the sub residual echo obtained from the subtracter (26) is considerably smaller than that of the main residual echo, the sub echo estimator (22) is considered to be convergent. As a result, each coefficient of the sub H register (221) in the sub echo estimator (22) is accumulated on the related coefficient of the main H register (211) in the main echo estimator (21). After the coefficient accumulation, the sub H register (221) is reset to an initial state, and then both echo estimators (21, 22) are re-operated in the ordinary operation.

The transmit output signal Sout at the transmit output port (8) of the present echo canceller is obtained from the output of the subtracter (25), that is, the main residual echo. In the main echo estimator (21), a step gain having either a very small value or zero is used for coping with divergence due to double talking or channel noise disturbance, whereas a step gain having a relatively large value is applied in the sub echo estimator (22) to achieve rapid convergence. The accumulation of the coefficients can achieve rapid convergence in the main echo estimator (21) even if the very small step gain is applied to it.

Figure 1:
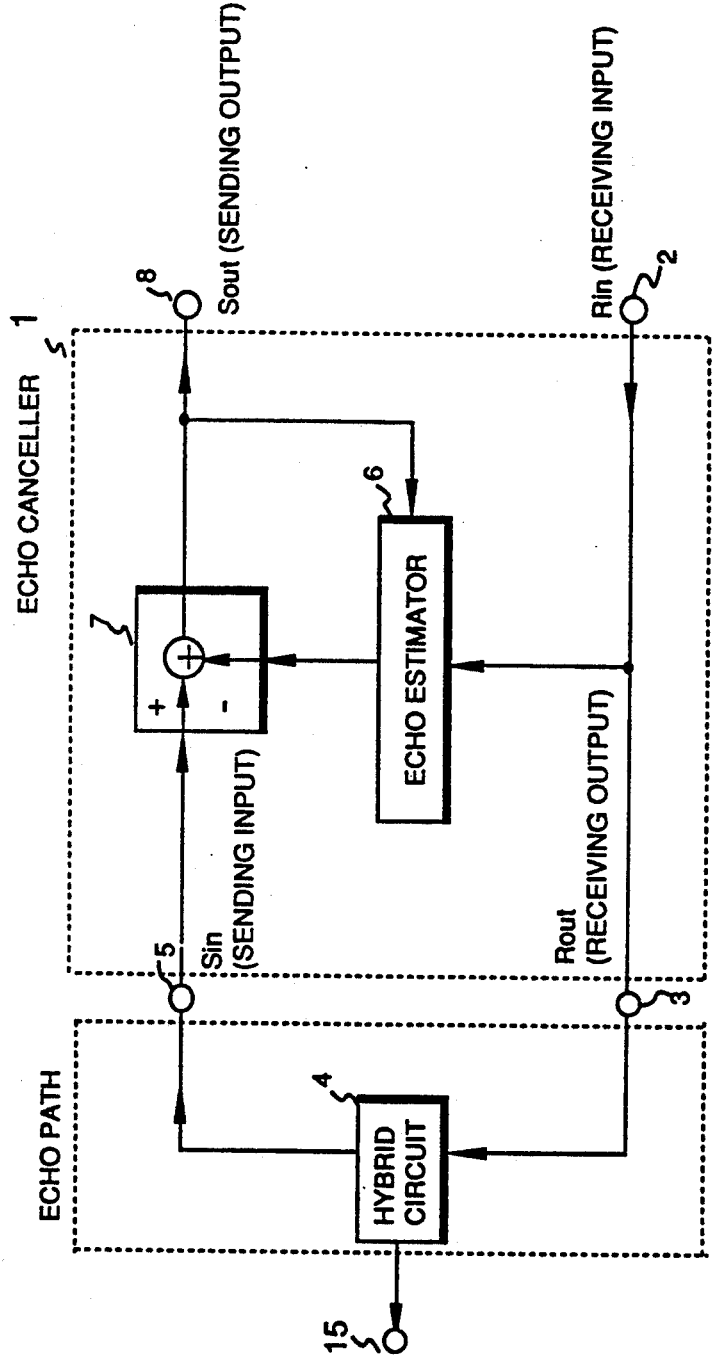
FIG. 1 is a basic structure of an echo canceller in a telephone connection.
Figure 2:
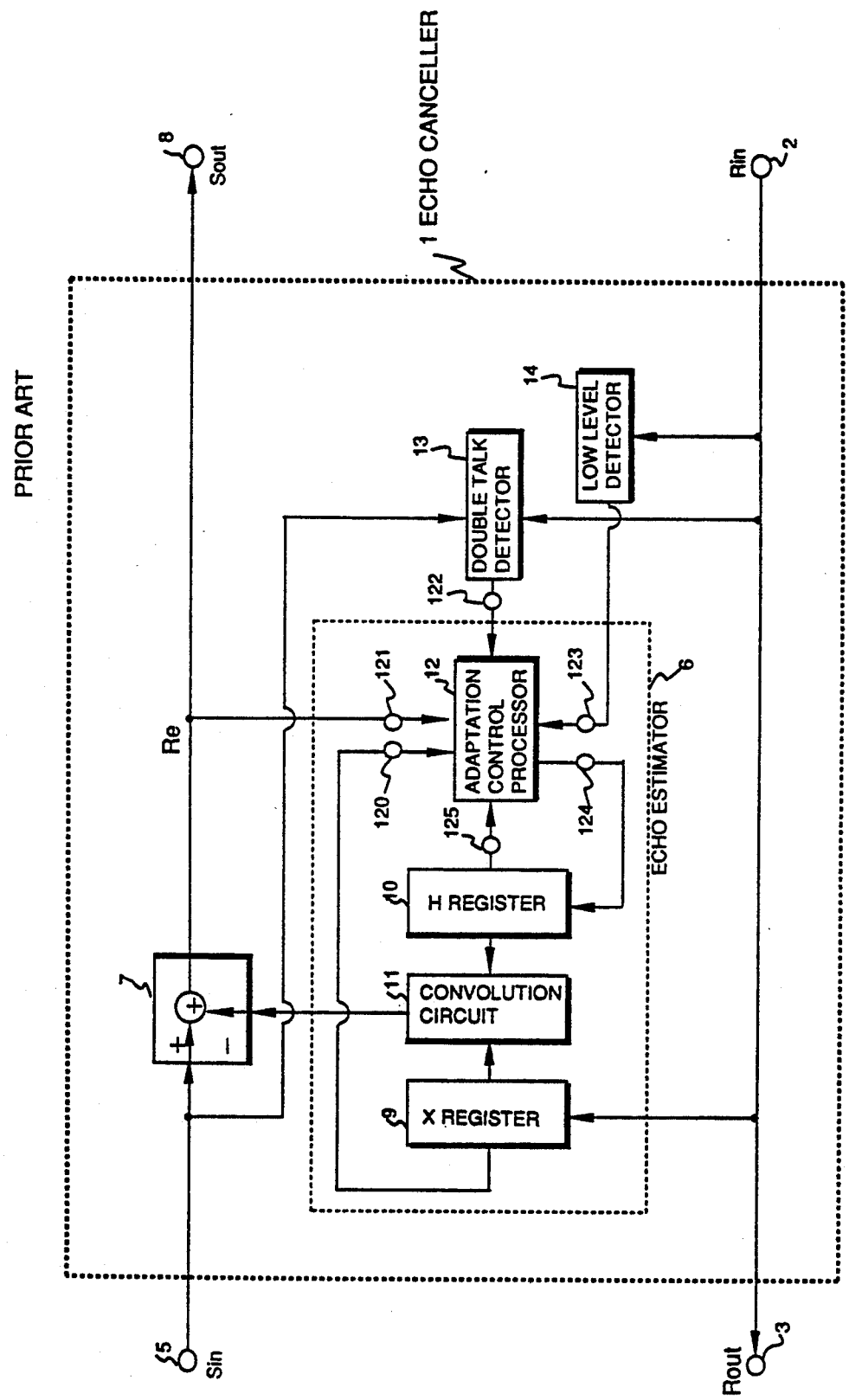
FIG. 2 is a functional configuration of the prior echo canceller (1)
Figure 5:
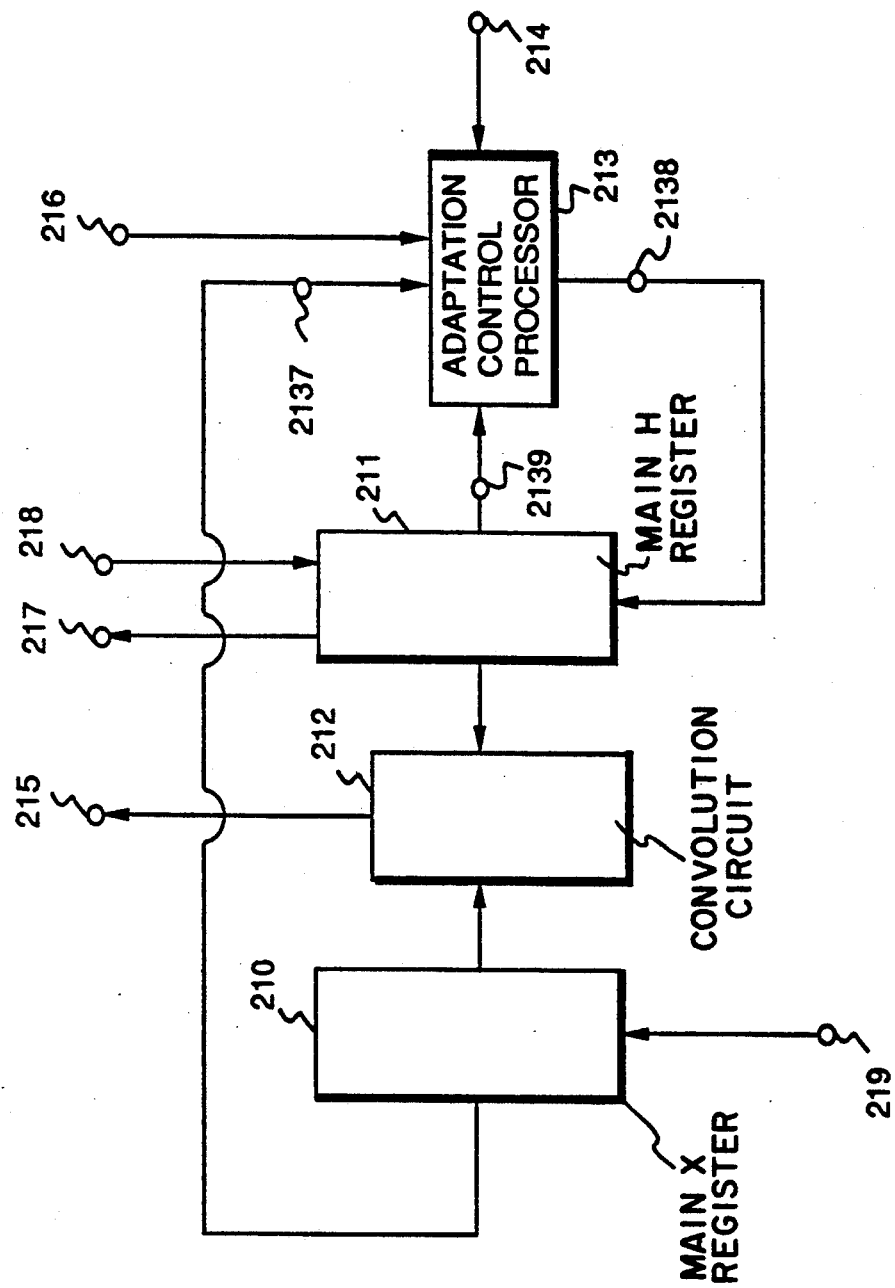
FIG. 5 is a functional configuration of a main echo estimator (21)
Figure 6:
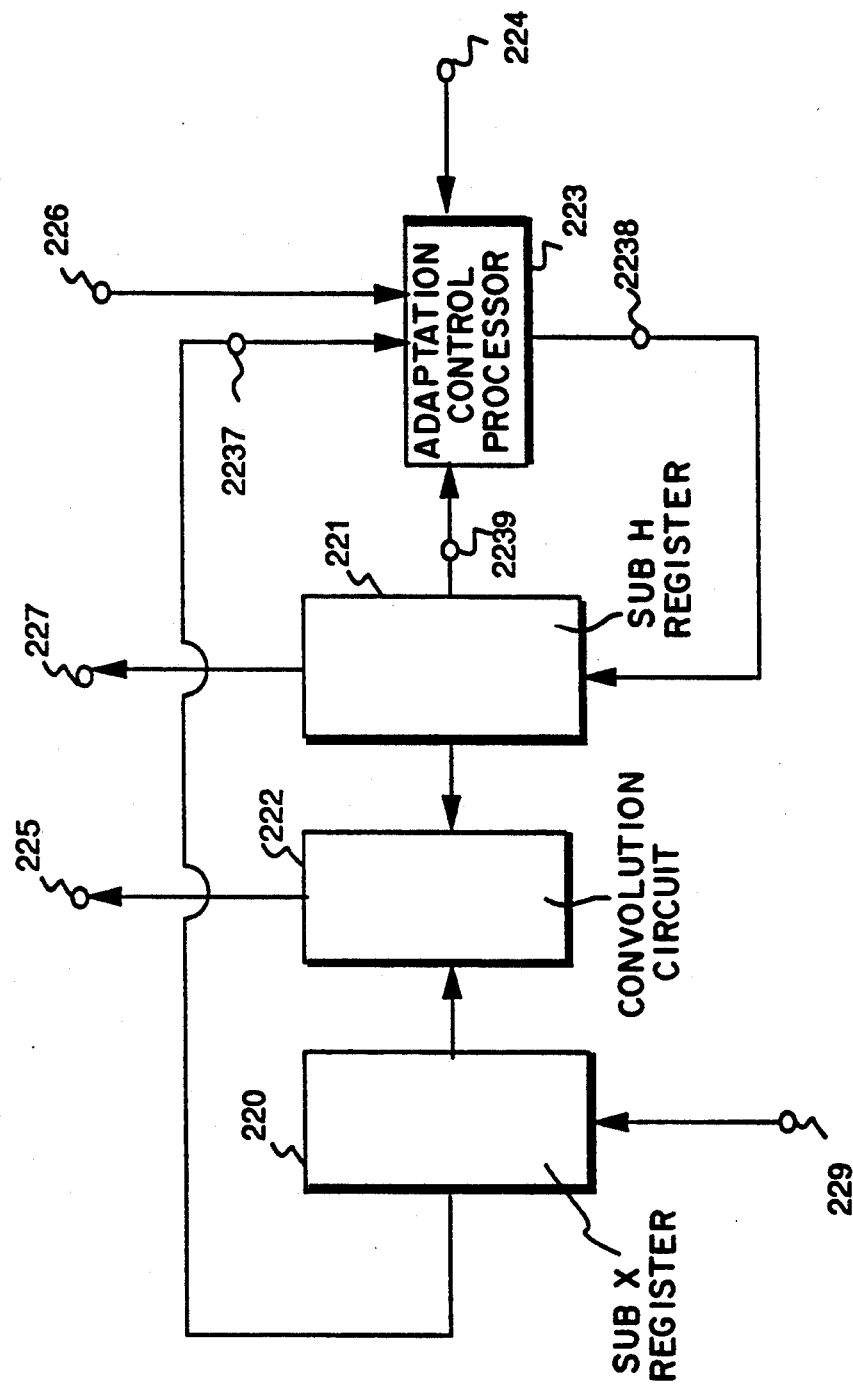
FIG. 6 is a functional configuration of a sub echo estimator (22)

This present echo canceller can maintain excellent performance under the various conditions of large channel noise and low level of the receive input signal, during the initial stage for a hybrid circuit with a low ERL, even during double talking, and at the front-end of talkspurt after double talking The operation of the echo canceller according to the present invention will now be described in detail. The functional configurations of these estimators (21, 22) shown in FIGS. 5 and 6 are the same as that of the echo estimator (6) in FIG. 2. The estimates are calculated through the convolution circuits (212, 222), respectively. The convolution circuit (212) manipulates the receive input signal Sin stored in the main X register (210) and the filter coefficients stored in the main H register (211) to generate the estimate which is fed to the subtracter (25). The output of the subtracter (25) as the main residual echo Re1 is sent through the transmit output port (8) to the far-end talker, and also is fed back to the main echo estimator (21) through the port (216) for updating the coefficients. The convolution circuit (222) also manipulates the receive input signal stored in the sub X register (220) and the filter coefficients stored in the sub H register (221) to generate the estimate which is fed to the subtracter (26). The output of the subtracter (26) as the sub residual echo Re2 is also fed back to the sub echo estimator (22) through the port (226) for updating the coefficients in the sub H register (221). The updating of the coefficients in the main and sub H registers (211, 221) is performed in the adaptation control processors (213, 223) by using the receive input signal and the residual echoes Re1 and Re2, respectively.

The convergence control processor (24) determines the situation of the sub echo estimator (22) by comparing the levels of the residual echoes Re1 and Re2 with reference to control signals from the double talk and low level detectors (13, 14). According to the convergent situation, the register accumulator (23) accumulates the filter coefficients in the sub H register (221) from the port (227) on the related filter coefficients in the main H register (211) from the port (217) and after the accumulation, the sub H register (221) is reset through the port (224). The accumulated coefficients are replaced in the main H register (211) through the port (218), and both echo estimators are then processed by the same ordinary operations as for the echo estimator (6) in the prior echo canceller (1). When the sub echo estimator (22) is detected to be divergent in the convergence control processor (24), the sub H register (221) is reset, and is then processed by the ordinary operation. For other situations in the sub echo estimator (22), in which it is difficult to judge whether the estimator is converged or diverged, the same ordinary procedures are performed in the estimators (21, 22) as in the conventional echo canceller (1).

The convergence control processor (24) feeds the control signals to the main echo estimator (21) through the port (214) and to the sub echo estimator (22) through the port (224), in order to choose the step gain and to perform either the coefficient accumulation, the sub H register reset or the updating of the coefficients in both of the echo estimators (21, 22).

When the double talk situation is detected or a low level of the receive input signal is detected, the step gain is changed from a very small value to 0 in the main echo estimator (21) and also from a large value to a small value in the sub echo estimator (22) according to the control signals from the convergence control processor (24).

In this embodiment, different X registers are used separately in the main and sub echo estimators. However, it is possible to share the X register (210) to make the hardware simple in the sub echo estimator (22).

Figure 3:
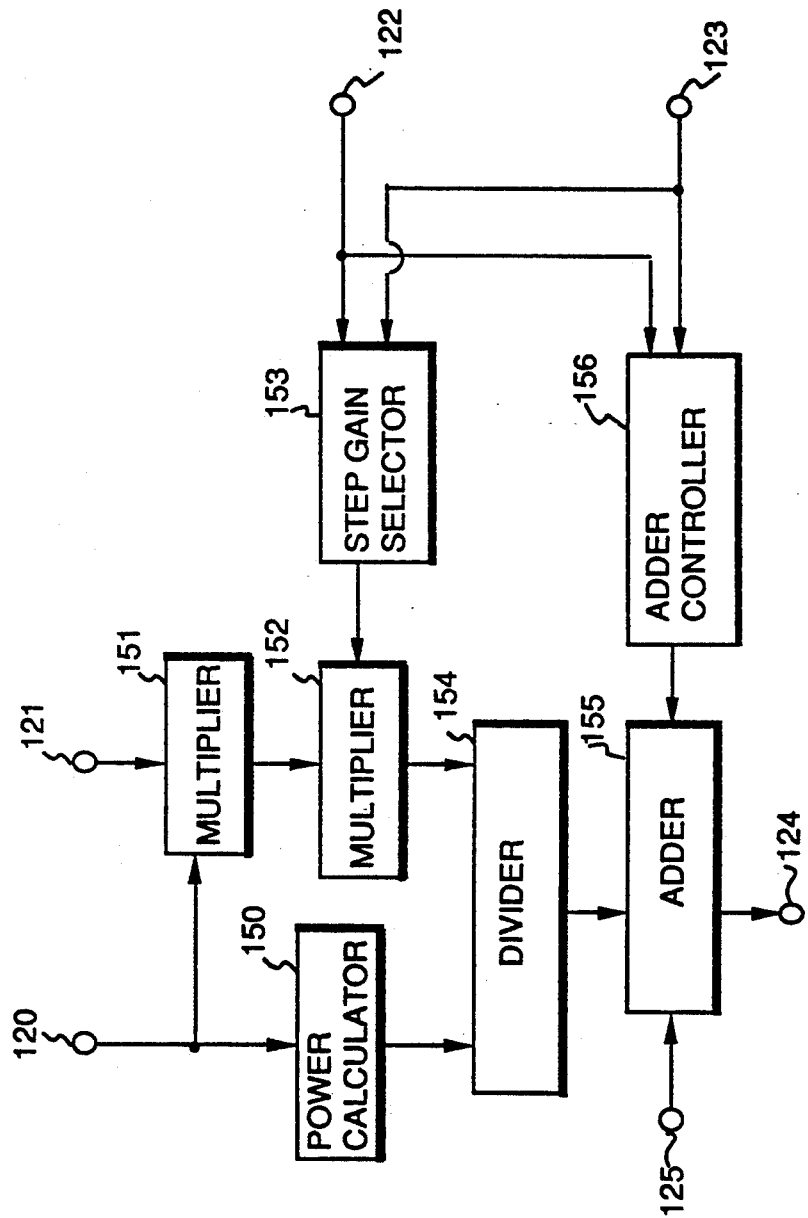
FIG. 3 is a functional configuration of an adaptive control processor (12) in the prior echo canceller (1)
Figure 7:
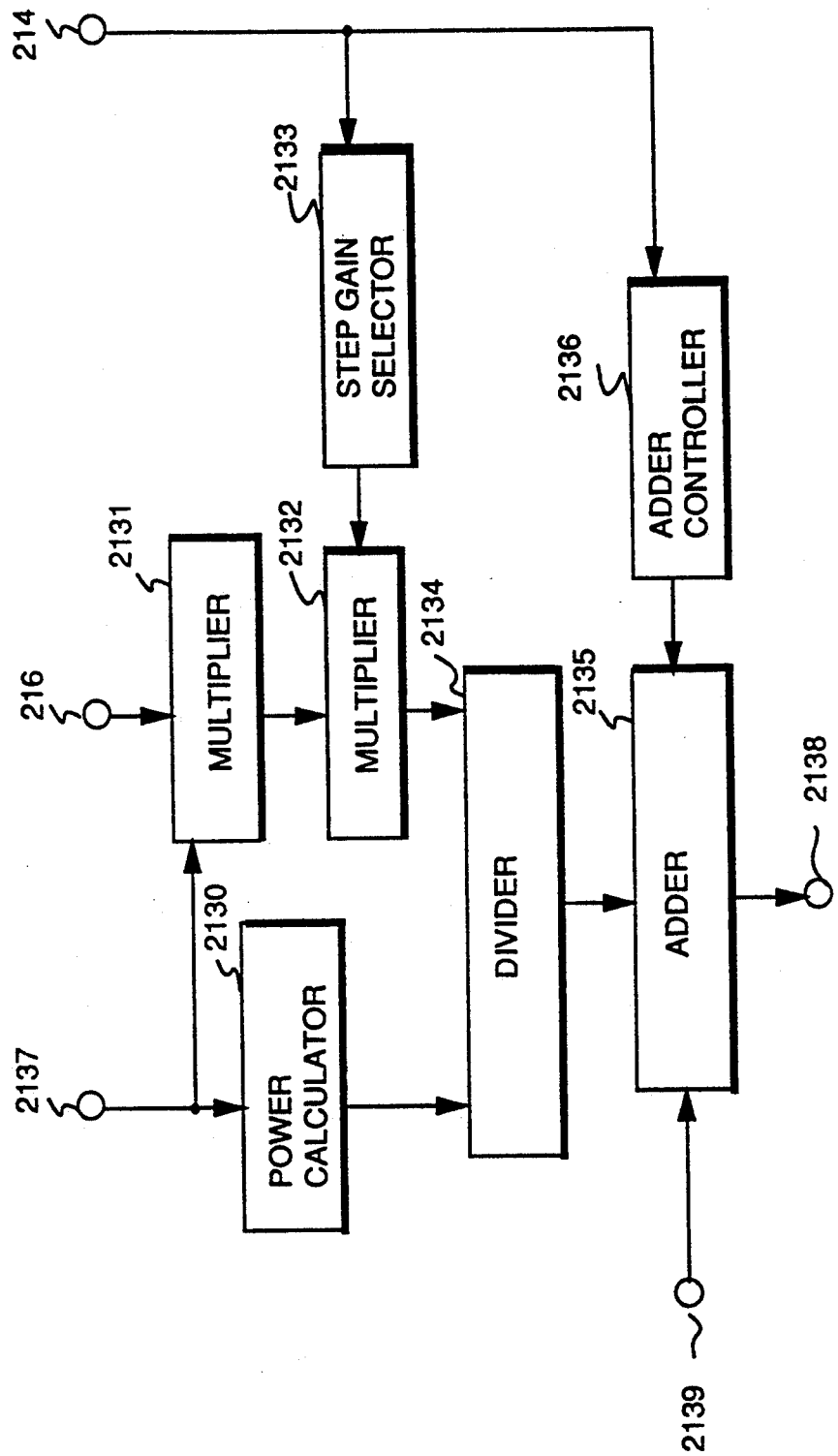
FIG. 7 is a functional configuration of an adaption control processor (213) in the main echo estimator (21)

FIG. 7 shows the configuration of the adaptation control processor (213) which has the same configuration as that of (12) in the conventional echo canceller (1) shown in FIG. 3. The control signal from the convergence control processor (24) is fed to the step gain selector (2133) and the adder controller (2136) through the port (214). A step gain is selected and fed to the multiplier (2132). The functions of the multipliers (2131, 2132), the power calculator (2130), the divider (2134), the adder controller (2136) and the adder (2135) for the coefficient updating are the same as those in the adaptation control processor (12) in the conventional echo canceller (1). The configuration of the adaptation control processor (223) is also the same as that of (213). The prepared step gains in the main echo estimator (21) are relatively smaller than those in the sub echo estimator (22) so as not to cause the filter coefficients to diverge from the impulse response of the echo path even during double talking. On the other hand, the sub echo estimator (22) prepares a relatively large step gain to achieve quick convergence for the near-end echo as much as possible and a small one to maintain relatively stable convergence for double talking and channel noise.

In the beginning stage of double talking, the filter coefficients of the sub H register (221) are abruptly corrupted and deviated due to the large step gain before the double talk detector (13) detects the double talk situation. Accordingly, the sub echo estimator (22) results in a rapid increment of the sub residual echo Re2 caused by the divergence of the sub H register (221). However, there is no effect on the performance of the main echo estimator (21), because the very small step gain prevents the coefficient from divergence and the rapid detection of the divergence of the sub echo estimator (22) in the convergence control processor (24) can prohibit the coefficient accumulation. The sub H register (221) is rest to release the divergent coefficients.

As above mentioned, operations with three control modes are prepared in the present echo canceller. They are an ordinary mode, an accumulating mode and a reset mode. In the convergence control processor (24), the mode is determined according to the result of the level comparison between the residual echoes Re1 and Re2, and the step gains are also chosen, depending on the mode and the control signals from the double talk and low level detectors (13, 14). A detail algorithm of determining the mode embodied is given as follows;

(a) Accumulating mode

In the accumulating mode, the following process is performed. In the comparison with the levels of Re1 and Re2, the convergence of of the sub echo estimator (22) can be examined by $$Lav(Re1)/Lav(Re2) > Lth2, \quad [6]$$

where Lth2 is a threshold level, and Lav(x) is the averaged level of x. When the formula [6] is satisfied consequently m1 times, where m1 is a given integer value, the sub echo estimator (22) is judged to have converged. As a result, the convergence control processor (24) outputs the control signals to the register accumulator (23), the main and sub echo estimators (21, 22) for accumulating the coefficients in the convergent sub H register (221) on the related coefficients in the main H register (211), as given by $$Hm(i)|n+1 = r1*Hm(i)|n + r2*Hs(i)|n, \quad [7]$$

where r1 and r2 are constants in the range of $0 \leq r1$ and $r2 \leq 1$, i is the i-th tap position varying from 0 to $N-1$, $Hm(i)|n$ is the filter coefficient at the i-th tap in the main H register (211) at the n-th sample index, and $Hs(i)|n$ is the filter coefficient at the i-th tap in the sub H register (221) at the n-th sample index, respectively. The convergence control processor (24) then outputs the control signal to reset the sub H register (221), as given by $$Hs(i)|n+1 = 0 \text{ or an initial value}, \quad [8]$$

where i is the i-th tap position varying from 0 to $N-1$. The main echo estimator (21) can achieve a rapid convergence by the accumulation process, even if the step gain is very small.

After performing these processes, both main and sub echo estimators (21, 22) operate again in the ordinary mode for the coefficient updating. When the double talk situation is detected, the step gains are respectively selected to be zero and a small value in the adaptation control processor (213, 223). This accumulation can be performed even under the false double talk detection or the low level situation, because, for the echo path having a low echo return loss (ERL), the double talk detector falsely detects the near-end echo as the near-end talker's talkspurt. Satisfying the formula [6] indicates that there is a large correlation between the transmit and receive inputs due to the echo components. On the other hand, in the right double talk situation, the formula [6] can not be satisfied successively m1 times because of the increment in Lav(Re2) due to the rapid divergent coefficients in the sub H register (221), and the mode therefore becomes the reset mode soon. When the low level detector (14) is activated, the step gains of the main and sub echo estimators (21, 22) are set the same values as those in case of double talking, respectively. During the activation of the low level detector (14), the accumulation process can be performed whenever the formula [9] is satisfied.

When the near- and far-end talkers are not in double talking, the level of the sub residual echo Re2 rapidly becomes smaller than that of the main residual echo Re1 in case of the main echo estimator (21) having a deviated impulse response from that of the echo path, resulting in repetition of the accumulating mode.

After the accumulation at the n-th sample index, Re1 at the $n+1$-th sample index becomes $$Re1(n + 1) = \text{Sin}(n + 1) - \sum_{i=0}^{N-1} Hm(i)|n + 1 * X(n + 1 - i) \qquad [9]$$

$$= \text{Sin}(n + 1) - \sum_{i=0}^{N-1} Hm(i)\bigg|n * X(n + 1 - i) - \sum_{i=0}^{N-1} Hs(i)\bigg|n * X(n + 1 - i), \qquad [10]$$

and tends roughly to Re2(n). This means that the main echo estimator (21) can converge rapidly by the accumulation process using the large step gain in the sub echo estimator (22), even though the step gain in the main echo estimator (21) is very small.

(b) Reset mode

When the formula [11] is consequently satisfied m2 times, the mode becomes the reset mode where m2 is an integer number. The formula [11] is given by $$\text{Lav}(Re1)/\text{Lav}(Re2) < Lth3, \qquad [11]$$

where Lth3 is a threshold level. In this mode, the sub H register (221) is judged to have diverged, resulting in a level increment in the sub residual echo Re2. The convergence control processor (24) outputs the control signal to reset the sub H register in the sub echo estimator (22). The sub H register (221) is reset to either zero or an initial value, as given by $$Hs(i)|n+1=0 \text{ or an initial value}, \qquad [12]$$

or may be reset by $$Hs(i)|n+1=r3*Hs(i)|n, \qquad [13]$$

where r3 is a constant in the range $0 \leq r3 \leq 1$, and i is the i-th tap position varying from 0 to N−1.

When the mode changes to the reset mode satisfying the formula [11], even if the double talk detector does not detect the double talk situation, it is recognized that the disturbance in the sub H register (221) has already occurred due to the front-end portion of double talking. The reset mode is also easily determined during double talking. The step gains of the main and sub echo estimators (21, 22) can be set to zero and a small value in this mode, respectively. After this procedure, both main and sub estimators (21, 22) operate again in the ordinary mode.

The main H register (211) is hardly affected at the front-end portion of double talking, during double talking and in the presence of channel noise by setting the step gain to either zero or a very small value and by prohibiting the coefficient accumulation, whereas the H register (10) in the conventional echo canceller (1) becomes divergent due to the step gain in the range 0.3 to 0.25 to achieve reasonable convergence.

The use of the formulae [6] and [11] means that it is not necessary to apply the double talk detector (13) and the low level detector (14) in the present echo canceller (20) by carefully setting the step gain depending on the extent of the divergence.

(c) Ordinary operating mode

When both the formulae [6] and [11] are not consequently satisfied, the mode becomes the ordinary mode, and the echo estimators (21, 22) independently perform the ordinary operations with the coefficent updating. The coefficients in both main and sub H registers (211, 221) are independently updated without the coefficient accumulation. When either the double talk detector (13) or the low level detector (14) is activated, the step gains for the main and sub echo estimators (21, 22) are set equal to zero and a small value, respectively, whereas those are set to be a very small and large values, respectively, during non-activation of these detectors (13, 14).

The previous echo canceller (1) can not provide good performance for low levels of the receive input signal, because a relatively high threshold in the low level detector (14) is set to avoid the divergence at the sacrifice of rapid convergence for successive low level talkspurts having a different frequency spectrum. However, the present echo canceller (20) can perform well even for low levels of the receive input signal. The step gain of either zero or a very small value makes the main echo estimator (21) very robust to such disturbances, maintaining rapid convergence by the accumulation process.

The present echo canceller (20) with both main and sub echo estimators (21, 22) having the coefficient accumulation process achieves a better cancellation performance than the previous echo canceller (1) with regard to not only echo return loss enhancement but also to convergence speed as described above.

In the convergence control processor (24), the averaged levels of Re1 and Re2 may be compared either at each several sample intervals, or at each sample time. The average amplitude of Re1 and Re2 can also be used for the comparison instead of the averaged power level. The situation of the sub echo estimator can also be judged in comparison with the levels of not only the main and sub residual echoes but also the transmit input signal.

EMBODIMENT 2

Figure 8:
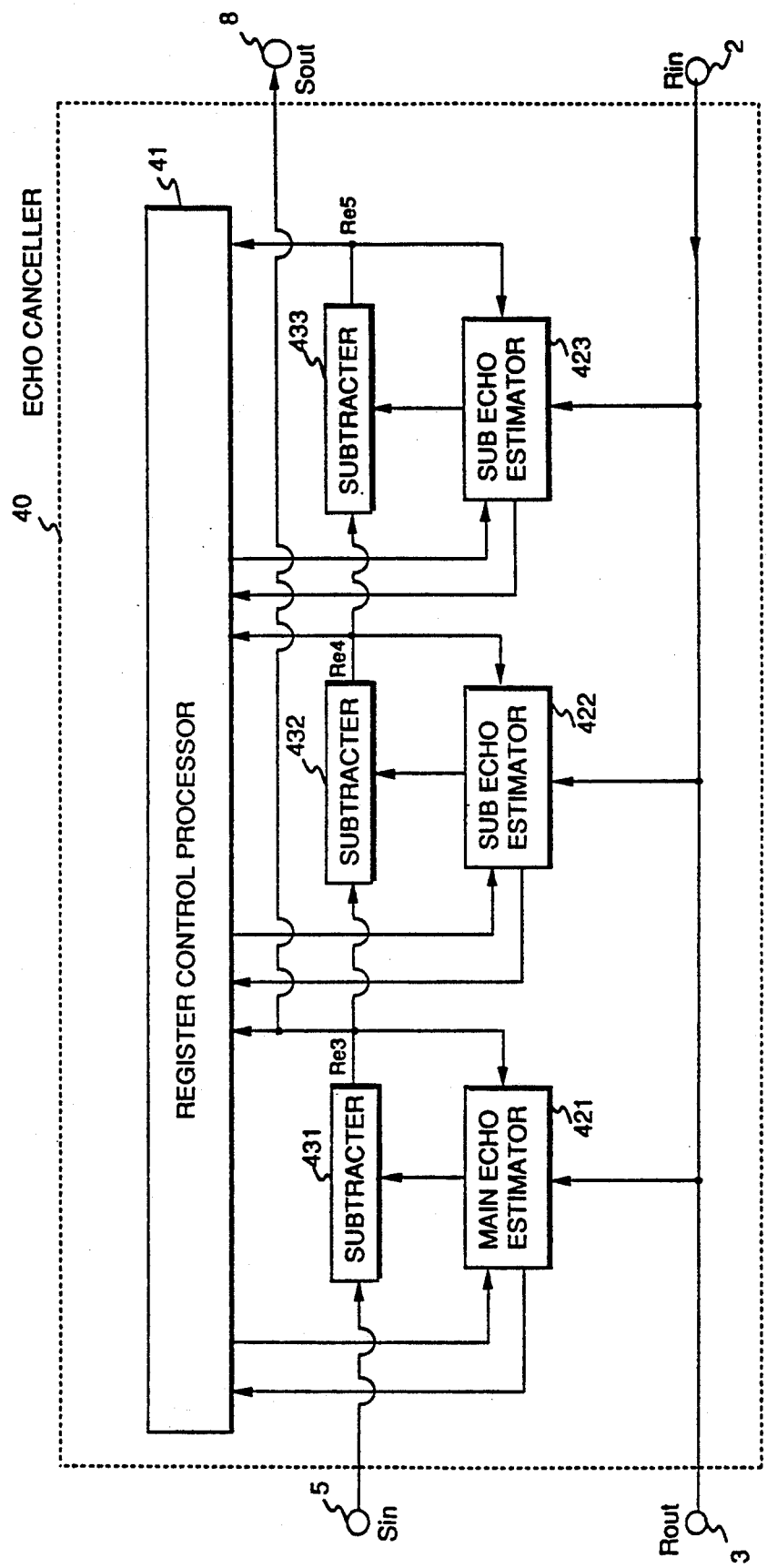
FIG. 8 is a functional configuration of another echo canceller (40) according to the present invention.

As the second embodiment of the present invention, plural subtracters, each of which is coupled with a sub echo estimator, are connected in cascade to a subtracter coupled with a main echo estimator, as shown in FIG. 8. The present echo canceller (40) comprises basically the main echo estimator (421), two sub echo estimators (422, 423), three subtracters (431, 432, 433) and a register control process (41) having the same functions as those of the convergence control process (24) and the register accumulator (23) in the first embodiment. At least three levels of the main and sub residual echoes Re3, Re4 and Re5, which correspond to the outputs of the subtracters (431, 432, 433) respectively, are compared to judge the situation of the sub echo estimators in the register control processor (41). The filter coefficients in the sub echo estimator (422) and/or in the sub echo estimator (423) are accumulated on the coefficients corresponding to the same tap position in the main H register of the main echo estimator (421), depending on the convergent situation in each sub echo estimator. The sub echo estimator (422) is deemed to be convergent when the output Re4 from the subtracter (432) reaches a level below a given threshold in comparison with that of the residual echo Re3 from the subtracter (431). The sub echo estimator (423) is also deemed to be convergent when the output Re5 from the subtracter (433) becomes a level below a given threshold in comparison with that of the residual echo Re4 from the subtracter (432). The three modes, that is, an accumulating mode, an ordinary mode and a reset mode are also provided in the register control processor (41), and the controls are the same as those in the convergence control processor (24) of the echo canceller (20). A high performance can also be achieved by an appropriate assignment of the step gains to the echo estimators (421, 422, 423). The double talk detector and/or the low level detector can also be applied to this embodiment as to the first embodiment.

EMBODIMENT 3

Figure 9:
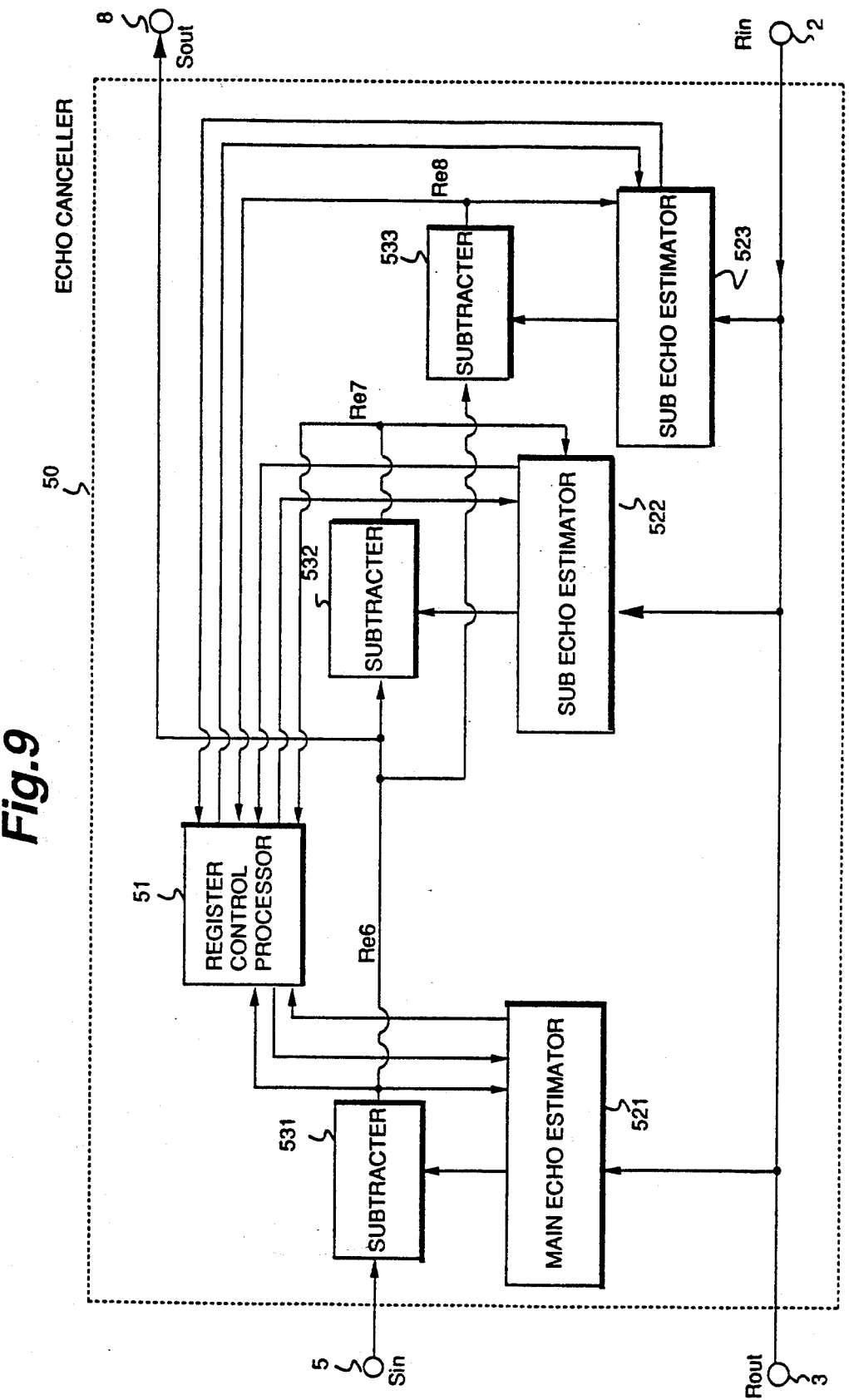
FIG. 9 is a functional configuration of another echo canceller (50) according to the present invention.

The third embodiment of the present invention is shown in FIG. 9. In the present echo canceller (50), a plurality of subtracters (532, 533) is connected in parallel to the subtracter (531) which is coupled with a main echo estimator. The main residual echo Re6 is obtained by subtracting an estimate derived from the main echo estimator (521) from the transmit input signal, and is output to the transmit output port (8). The subtracter (532) subtracts an estimate derived from the sub echo estimator (522) from Re6, and also the subtracter (533) subtracts an estimate derived from the sub echo estimator (523) from Re6. The subtracters (532, 533) provide the sub residual echoes Re7 and Re8, respectively. The step gains in the sub echo estimators (522, 523) are different from each other. Coefficients of the convergent sub echo estimator which provides a level below a given threshold in comparison with the level of Re6 are accumulated on the coefficients corresponding to the same tap position in the main echo estimator (521). The register control processor (51) chooses also the mode from three modes according to the situations of the sub echo estimators and the functions are the same as those in the register control processor (41). The double talk detector and/or the low level detector can also be applied to this embodiment as to the first embodiment.

EMBODIMENT 4

Figure 10:
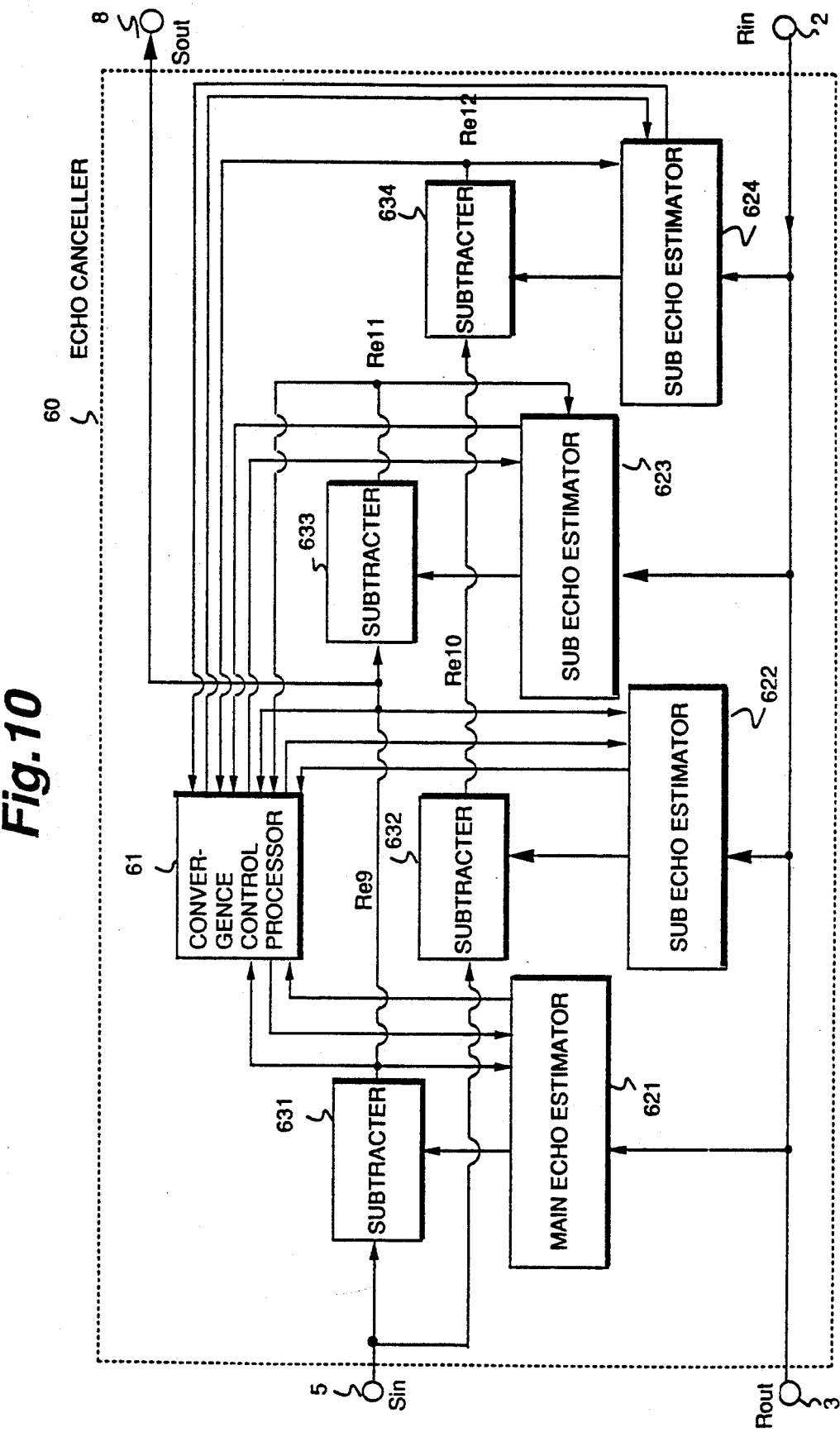
FIG. 10 is a functional configuration of another echo canceller (60) according to the present invention.

The fourth embodiment of the present invention is shown in FIG. 10. In the present echo canceller (60), a subtracter (632) coupled with a sub echo estimator is connected in parallel with a subtracter (631) coupled with a main echo estimator (621). At the subtracter (631), the main residual echo Re9 is obtained by subtracting an estimate derived from the main echo estimator (621) from the transmit input signal, and is output to the transmit output port (8). The subtracter (633) then subtracts an estimate derived from the sub echo estimator (623) from Re9, and outputs the sub residual echo Re11. Furthermore, the subtracter (632) is connected in parallel to the subtracter (631) to subtract an estimate derived from the sub echo estimator (622) from the transmit input signal, and outputs the sub residual echo Re10. The subtracter (634) then subtracts an estimate derived from the sub echo estimator (624) from Re10, and outputs the sub residual echo Re12. Coefficients of the convergent sub echo estimators (623) are accumulated on the related coefficients in the main echo estimators (621), if Re11 has a level below a given threshold in comparison with the level of Re9. The coefficients of the convergent sub echo estimator (624) are also accumulated on the related coefficients in the corresponding sub echo estimator (622) under the same conditions as those for the sub echo estimator (623). The register control processor (61) prepares four modes. Three modes, that is, an accumulating mode, an ordinary mode and a reset mode are provided in the register control processor (61) having the same functions as those in the register control processor (41) in the second embodiment. A transfer mode is also prepared in addition to the three modes. If the level of Re10 becomes below a given threshold in comparison with that of Re9 in the register control processor (61), the transfer mode is chosen to transfer the coefficients of the sub echo estimator (622) providing better cancellation performance to those of the main echo estimator (621). The transfer mode can achieve a very rapid convergence even for an abruptly changed impulse response of the echo path. A plurality of subtracters, each of which has a sub echo estimator and is followed by cascaded subtracters having sub echo estimators, can also be connected in parallel with the subtracter having the main echo estimator.

EMBODIMENT 5

Figure 11:
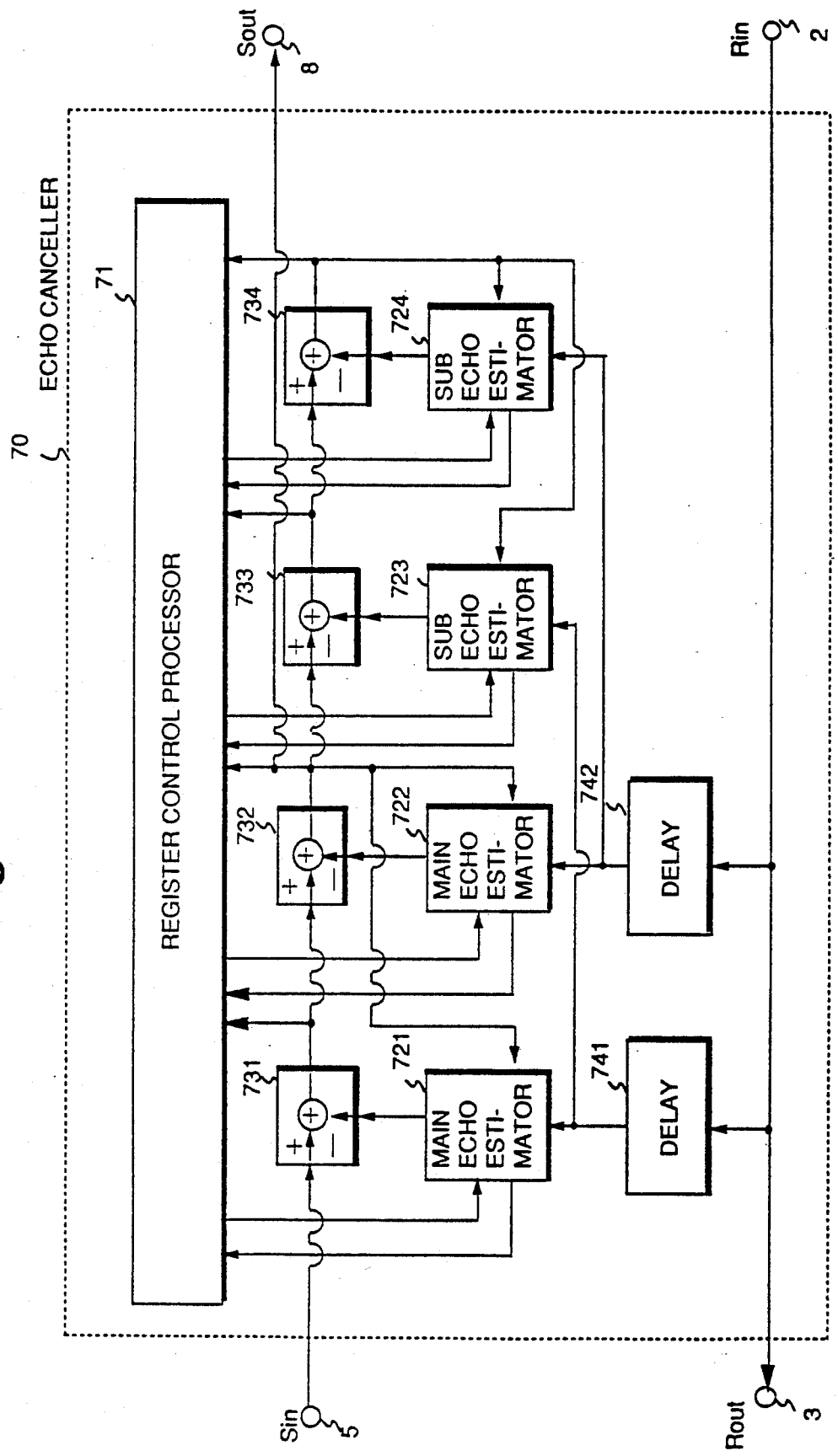
FIG. 11 is a functional configuration of another echo canceller (70) according to the present invention.

The foregoing echo cancellers according to the present invention are embodiments covering a relatively short echo path delay in the main echo estimator. In tele-conferences having a echo path delay with a considerably wide range in length, this invention can also be applied to cascaded echo cancellers having fixed delays to cover the whole range of the echo path delay, as shown in FIG. 11. In the echo cancellor (70) according to the fifth embodiment of the present invention, two main echo estimators (721) and (722), and two sub echo estimators (723, 724) are used. Subtracters (731, 732) coupled with main echo estimators (721, 722) and subtracters (733, 734) coupled with the sub echo estimators (723, 724) are connected in tandem, as shown in FIG. 11. A delay unit (741) is inserted only for a pure delay inherent in echo path transmission facilities, and also a delay unit (742) is inserted to compensate the delay which can not be covered in the main echo estimator (721) and the sub echo estimator (723). The delay in the delay unit (742) therefore corresponds to the total delay of the transversal filter in the main echo estimator (721) and the delay unit (741). When the convergence of the sub echo estimators (723, 724) is achieved, the coefficients in the convergent sub echo estimator are accumulated on those in the corresponding main echo estimator connected with the same delay unit. The outputs of the subtracters (731, 732, 733, 734) as the main and sub residual echoes are fed to the register control processor (71) to judge the situations of the sub echo estimators (733, 734). The output of the subtracter (732) is fed back to both main echo estimators (721, 722) for coefficient updating. The output of the subtracter (734) is also fed back to both sub echo estimators (723, 724) for coefficient updating. The functions of three modes, that is, an accumulating mode, an ordinary mode and a reset mode, in a register control processor (71) are the same as those in the register control processor (41). This embodiment can provide an excellent cancelation performance with a rapid convergence for an echo path having a wide range of echo path delay. A plurality of delay units coupled with one pair of a main echo estimator and a sub echo estimator can also be applied to extend the coverage of an echo path delay.

EMBODIMENT 6

Figure 12:
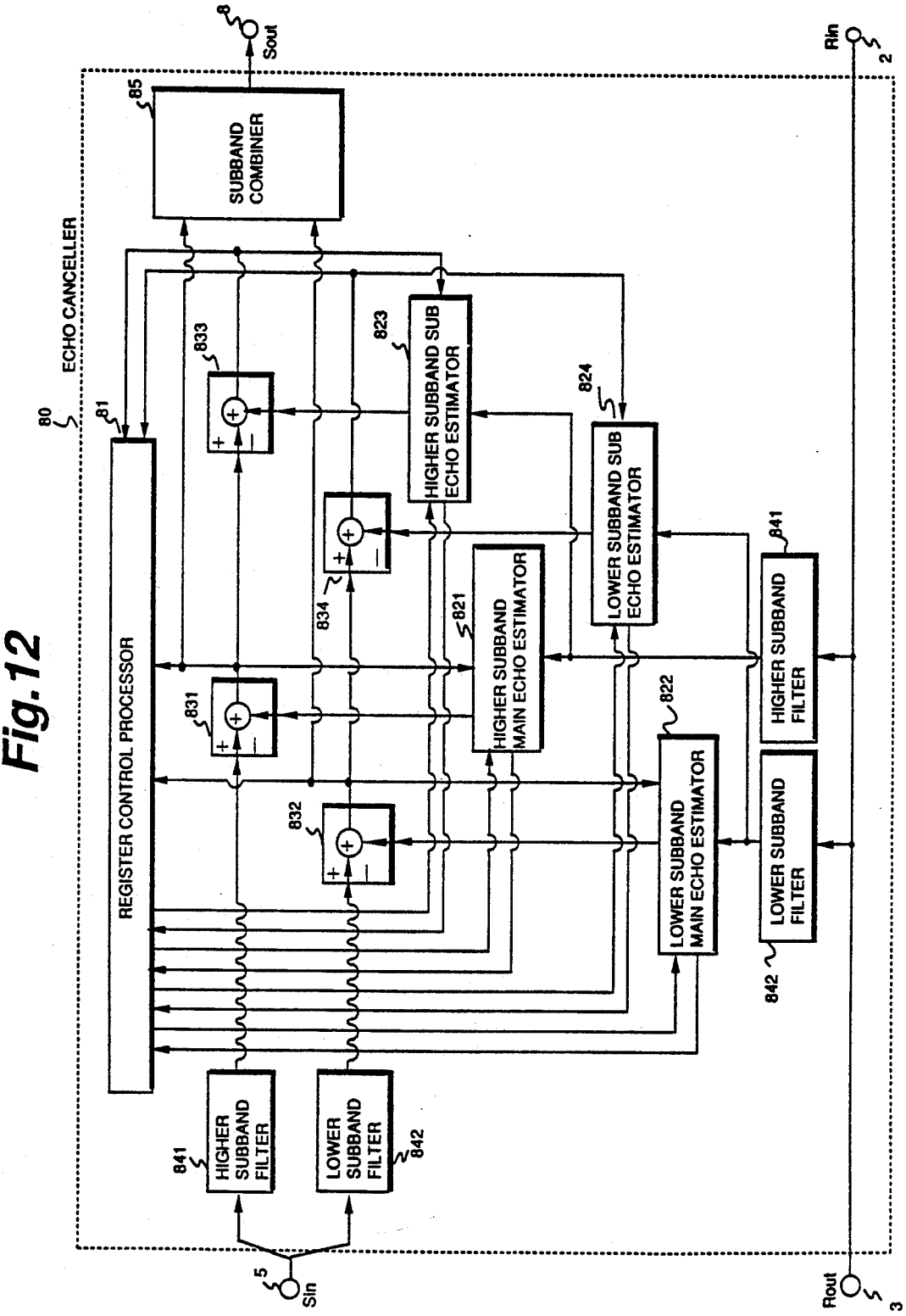
FIG. 12 is a functional configuration of another echo canceller (80) according to the present invention.

In FIG. 12, an echo canceller (80) in which the transmission band is split into two subbands is described as a sixth embodiment of the present invention. The receive and transmit input signals are split into high-pass and low-pass filtered components through higher and lower subband filters (841, 842), respectively. The higher subband filter (841) outputs a baseband signal converted from the high-pass filtered signal by a sampling decimation. The lower subband filter (842) also outputs a baseband signal converted from the low-pass filtered signal. A combiner (85) reproduces the transmit output signal having the original band from the subband main residual echoes derived from subtracters (831, 832). Subtracters (831, 833), higher subband main and sub echo estimators (821, 823) are provided for the higher subband signal. Subtracters (832, 834), lower subband main and sub echo estimators (822, 824) are also provided for the lower subband signal. A register control processor (81) has control functions for each subband which are the same as those in the register control processor (41). The bands are handled in each operation mode. The coefficient accumulations are performed between the convergent sub echo estimator (823) and the corresponding main echo estimator (821) for the higher subband, and between the convergent sub echo estimator (824) and the corresponding main echo estimator (822) for the lower subband, respectively, in the accumulating mode. This embodiment also gives an excellent cancelation performance with a rapid convergence for non-monotonous echo path characteristics and a robustness to double talking which occurs very frequently in tele-conferences. Subband filters can also be provided for dividing bandwidths of the receive and transmit input signals to a plurality of subbands. In each subband, a pair of the main and sub echo estimators is provided as described above.

The advantages of the present invention will now be summarized.

(1) By using a pair of the main and sub echo estimators, the filter coefficients in the convergent sub echo estimator can be accumulated on the filter coefficients corresponding to the same tap position in the main echo estimator, referring to the levels of at least main and sub residual echoes. The accumulation process provides an excellent echo cancellation performance with a rapid convergence and a robustness to double talking and channel noise disturbances.

(2) By monitoring the levels of the residual echoes in the convergence control processor or the register control processor, the extent of convergence of the sub echo estimators can be easily measured for the coefficient accumulation process or the reset process for the sub echo estimators. The accurate double talk situation can also be judged easily by measuring the extent of convergence. Accordingly, it can prevent divergence of the main echo estimator even for the front-end portion of double talking which can not be detected only by the double talk detector. This means that it is not necessary to use the double talk detector by judging the convergence of the sub echo estimator.

(3) By using the very small step gain in the main echo estimator, and inhibiting the coefficient accumulation in case of the divergent sub echo estimator, no degradation in the echo cancellation performance appears even if double talking frequently occurs.

(4) For an echo path having a low echo return loss, the accumulation process can provide a very stable and large echo return loss enhancement in echo cancellation with rapid convergence unaffected by false double talk detection.

(5) By setting a high step gain of the sub echo estimator, if the echo path impulse response is abruptly changed while the echo canceller is connected to a network, the accumulation process or the transfer of the coefficients in the convergent sub echo estimator into the related coefficients in the corresponding main echo estimator makes the main echo estimator converge very rapidly, providing a stable echo cancellation.

(6) In the previous echo canceller, the step gain has to be set zero for receive input signals having a low level to prevent divergence of the coefficients due to channel noise. This results in perception of a low level echo for the far-end talk spurts having various frequency spectra. The present echo canceller can maintain high cancellation performance even for such talk spurts, because the main echo estimator is very stable and can converge very rapidly by adopting the accumulation process even for such low level receive input signals.

The present invention is applicable, for instance, to echo cancellers for telephone channels including PSTN, ISDN and mobile communication networks, and/or tele-conferences including picture phone, TV conference and audio conference.

From the foregoing, it will be apparent that a new and improved echo canceller has been developed. It should be understood of course that the embodiments disclosed are merely illustrative and are not intended to limit the scope of the invention. Reference should be made to the appended claims, therefore, rather than the specification as indicating the scope of the invention.

What is claimed is:

1. An echo canceller, comprising:
    a first subtracter coupled with a main echo estimator for subtracting a first estimate from a transmit input signal to output a main residual echo to a transmit output port,
    said main echo estimator comprising an adaptive digital filter for synthesizing said first estimate of said transmit input signal from a transmit input port,
    a second subtracter coupled with a sub echo estimator for subtracting a second estimate from said main residual echo to output a sub residual echo, said sub echo estimator comprising an adaptive digital filter for synthesizing said second estimate of said main residual echo,
    a register accumulator for adding filter coefficients on each tap position of a plurality of tap positions in said sub echo estimator and filter coefficients corresponding to a same tap position in said main echo estimator as that of the sub echo estimator,
    a convergence control processor for controlling said main echo estimator, said sub echo estimator and said register accumulator according to a status of said sub echo estimator determined by levels of at least said main residual echo and said sub residual echo,
    wherein said first subtracter coupled with said main echo estimator is cascaded by at least one second subtracter coupled with said sub echo estimator, said filter coefficients in said sub echo estimator are accumulated in related filter coefficients in a corresponding main echo estimator according to a convergence of said sub echo estimator, and wherein said main residual echo and said sub residual echo are respectively fed back to said main and sub echo estimators for updating said filter coefficients.

2. An echo canceller according to claim 1, wherein said convergence control processor selects an operation mode from an ordinary mode, an accumulating mode, or a reset mode according to the status of said sub echo estimator determined by levels of at least said main residual echo and said sub residual echo, said accumulating mode is chosen under a convergence of said sub echo estimator, said reset mode is chosen under a divergence of said sub echo estimator, and said ordinary mode is chosen when said sub echo estimator does not converge and diverge, and wherein said ordinary mode, said filter coefficients in said main and sub echo estimators are updated according to a receive input signal and said main and sub residual echoes, respectively, and in said accumulating mode, said filter coefficients in said sub echo estimator are accumulated on said related filter coefficients in said corresponding main echo estimator through said register accumulator and after reset of said filter coefficients in said sub echo estimator in convergence, the mode is switched to said ordinary mode, and in said reset mode, said filter coefficients in said sub echo estimator in divergence are reset, and then the mode is switched to said ordinary mode.

3. An echo canceller according to claim 1, wherein said first subtracter coupled with said main echo estimator is followed by a plurality of cascaded second subtracters, each of which is coupled with a corresponding sub echo estimator, said first subtracter outputs said main residual echo to one of said cascaded subtracters and to said transmit output port by subtracting an estimate given by said main echo estimator from said transmit input signal, and said corresponding sub echo estimators provide respectively estimates to said second sub subtracters to obtain sub residual echoes, and a register control processor comprising said convergence control processor and said register accumulator controls said main and sub echo estimators and said register accumulator according to a status of said sub echo estimators determined by levels of at least said main and sub residual echoes, said register control processor determines the operation mode either to update said filter coefficients in each of main and sub echo estimators in an ordinary mode, to accumulate said filter coefficients in the sub echo estimator in convergence on said related filter coefficients in said main echo estimator and then reset filter coefficients in said sub echo estimators in convergence in an accumulating mode, or to reset said filter coefficients in sub echo estimators in divergence in a reset mode.

4. An echo canceller according to claim 1, wherein said first subtracter coupled with said main residual echo estimator is followed by a plurality of second subtracters in parallel, each of which is coupled with a sub echo estimator and outputs a sub residual echo, and said first subtracter obtains said main residual echo by subtracting an estimate given by said main echo estimator from said transmit input signal, the sub residual echoes are obtained respectively by subtracting estimates given by said sub echo estimators from said main residual echo, and a register control processor comprising said convergence control processor and said register accumulator controls said main and sub echo estimators and said register accumulator according to the situations of said sub echo estimators determined by levels of at least said main and sub echo residual echoes, said register control processor determines the operation mode either to update said filter coefficients in each of echo estimators in an ordinary mode, to accumulate said filter coefficients in said sub echo estimator in convergence on said related filter coefficients in said main echo estimator and then reset filter coefficients in said sub echo estimators in convergence in an accumulating mode, or to reset said filter coefficients in sub echo estimators in divergence in a rest mode.

5. An echo canceller according to claim 1, wherein said first subtracter coupled with said main echo estimator is followed by a plurality of second subtracters, at least one of said second subtracters being coupled in cascade with said first subtracter and at least one other of said second subtracters being in parallel with said first subtracter, each of said second subtracters being coupled with a sub echo estimator and outputs a sub residual echo, said main residual echo at said first subtracter is obtained by subtracting an estimate given by said main echo estimator from said transmit input signal, and one of said second subtracters in parallel with said first subtracter is coupled with a sub estimator and is followed by others of said plurality of second subtracters in cascade and in parallel, respectively, each of which is coupled with a sub echo estimator and outputs a sub residual echo, and a register control processor comprising said convergence control processor and said register accumulator controls said main and said sub echo estimators and said register accumulator according to the status of said sub echo estimators determined by levels of at least said main and sub residual echoes, and wherein said register control processor determines the operation mode either to update said filter coefficients in each of echo estimators in an ordinary mode, to accumulate said filter coefficients in said sub echo estimator in convergence on said related filter coefficients in said corresponding main echo estimator and to accumulate said filter coefficients in said convergent sub echo estimator on said related filter coefficients in said corresponding sub echo estimator and then reset said filter coefficients in said sub echo estimators in convergence at said register accumulator in an accumulating mode, to transfer said filter coefficients in said sub echo estimator to said related filter coefficients in said main echo estimator and then reset said filter coefficients in said sub echo estimator in a transfer mode, or to reset said filter coefficients in sub echo estimators in divergence in a reset mode.

6. An echo canceller according to claim 1, wherein a plurality of first and second subtracters is coupled in cascade, with each of said first subtracters being coupled with a main echo estimator, and each of said second subtracters being coupled to a sub echo estimator, a plurality of delay units is provided for compensating a delay in an echo path, which exceeds a range of delay covered by the echo estimator, said receive input signal is fed to a first of said main echo estimators and a related sub echo estimator, said one of said main echo estimators and said related sub echo estimator being coupled with one of said delay units, said one of said delay units having a fixed delay corresponding to an inherent delay of said echo path, said receive input signal also being fed to a second of said main echo estimators and a second related sub echo estimator coupled with a second of said delay units having a delay corresponding to a total delay in said first of said main echo estimators with the delay unit coupled thereto, an output of a first subtracter obtained by subtracting an estimate given by said first of said main echo estimators from said transmit input signal is fed to a first following subtracter of said plurality of first and second subtracters, said first following subtracter coupled with said second of said main echo estimator at a last stage provides said main residual echo to said transmit output port, to said first and second of said main echo estimators for updating filter coefficients and to a second following subtracter coupled with said sub echo estimator, said sub residual echo at a final subtracter of said plurality of first and second subtracters is fed to said sub estimators for updating filter coefficients, a register control processor comprising said convergence control processor and said register accumulator controls said first and second of said main echo estimators and said first and second of said sub echo estimators and said register accumulator according to the status of said first and second of said sub echo estimators determined by levels of at least main and sub residual echoes, said register control processor determines the operation mode either to update filter coefficients in each of said first and second of said main echo estimators and said first and second of said sub echo estimators in an ordinary mode, to accumulate said filter coefficients in a sub echo estimator in convergence on related filter coefficients in said corresponding main echo estimator through said register accumulator and then reset said filter coefficients in said sub echo estimator in convergence in an accumulating mode, or to reset said filter coefficients in a sub echo estimator in divergence in a reset mode.

7. An echo canceller according to claim 1, wherein subband filters are provided for dividing bandwidths of the receive and transmit input signals to a plurality of subbands to obtain subband transmit and receive input signals, a combiner is provided for synthesizing said transmit output signal having an original band with subband main residual echoes, a plurality of main echo estimators is provided for obtaining estimates of the subband transmit input signals, and each of said main echo estimators is coupled with a first of one of a first and second subtracters which outputs the subband main residual echo for a corresponding subband, a plurality of sub echo estimators is provided for obtaining estimates of the subband main residual echoes, respectively, and each of said sub echo estimators is coupled with a second of said first and second subtracters which outputs a subband sub residual echo for the corresponding subband, a register control processor comprising said convergence control processor and said register accumulator is provided for controlling said main and sub echo estimators and said register accumulator according to the situations of said sub echo estimators determined by levels of at least said subband main and sub residual echoes for the subbands, said register control processor selects the operation modes for the subbands from an ordinary mode, an accumulating mode and a reset mode according to respective status of said sub echo estimators, wherein according to the control signals from said register control processor, filter coefficients in said main and sub echo estimators are updated in said ordinary mode, respectively, filter coefficients in convergent sub echo estimator are accumulated respectively on said related filter coefficients in said corresponding main echo estimator through said register accumulator and then are reset in said accumulating modes, and filter coefficients in a sub echo estimator in divergence are reset in said rest mode.

8. An echo canceller according to any one of claims 1-7, wherein a step gain for coefficient updating in said main echo estimator is equal or smaller than a step gain in said corresponding sub echo estimator.

9. An echo canceller according to claim 8, wherein said step gains for coefficient updating in said main and corresponding sub echo estimators are chosen from prepared values through said convergence control processor according to the status of said sub echo estimator determined by levels of at least said main and sub residual echoes.

10. An echo canceller according to claim 8, wherein at least one of a double talk detector and a low level detector for said receive input signal are provided for controlling said step gains in at least one of said main echo estimators and said sub echo estimators.

* * * * *